UNITED STATES PATENT OFFICE.

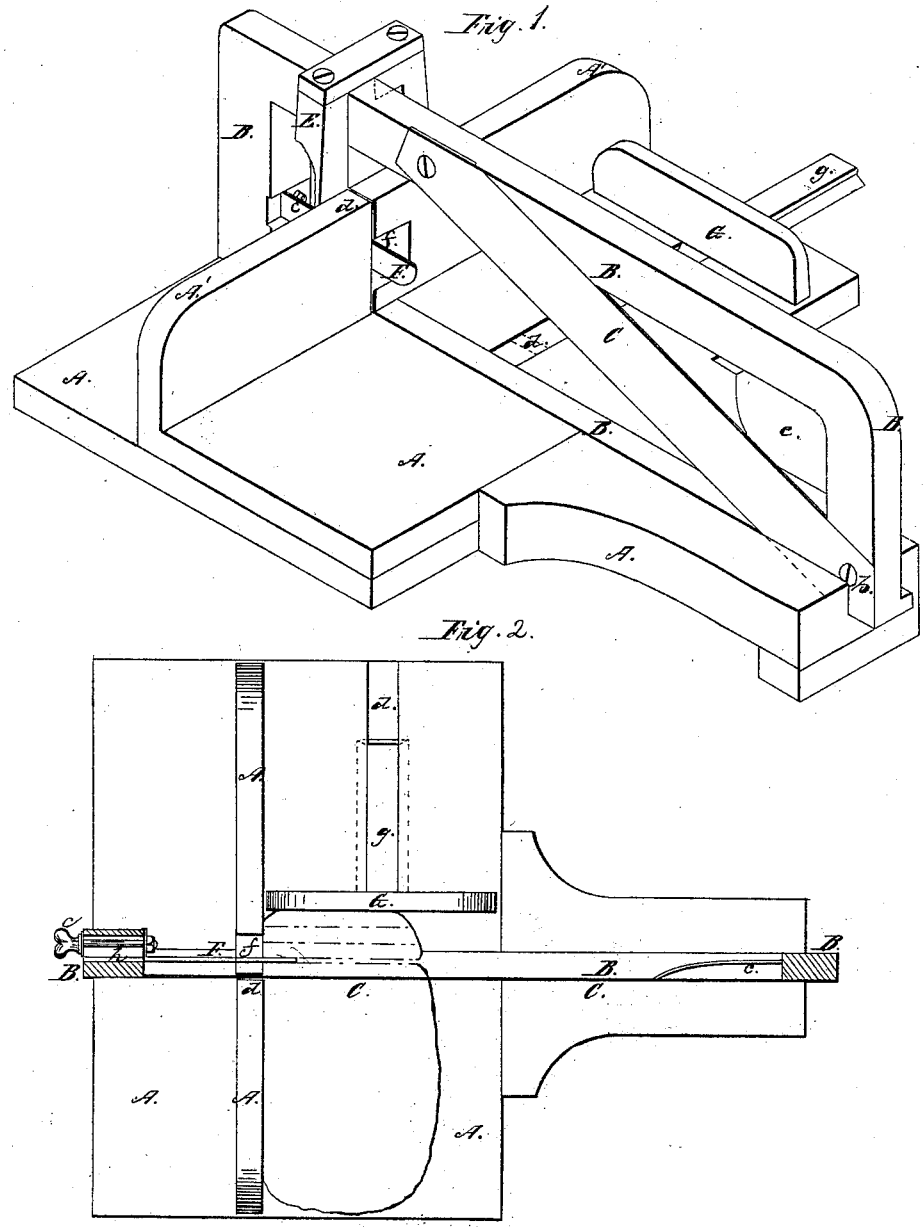

JAMES STILLEY, OF CINCINNATI, OHIO.

BREAD-SLICER.

Specification of Letters Patent No. 27,318, dated February 28, 1860.

*To all whom it may concern:*

Be it known that I, JAMES STILLEY, of Cincinnati, Hamilton county, Ohio, have invented a new and useful Machine for Slicing Bread and other Edibles; and I do hereby declare the following to be a full, clear, and exact description of the same, reference being had to the accompanying drawings, making part of this specification.

My invention relates to a machine for slicing bread, meat, saur kraut, &c., and consists of a knife or cutter set diagonally in a rectangular sliding frame adapted to pass through a suitable angular abutment against which the material to be cut is placed, said frame being also provided with an adjustable gage by which the thickness of slices of bread or other edibles to be cut may be regulated to suit taste or requirement.

In the accompanying drawings Figure 1 is a perspective view of a slicer embodying my improvement. Fig. 2 is a sectional plan of the same.

A is the table of the slicer having as shown a vertical abutment board A′. The board A′ has an incision $a$ the whole of its depth which allows of the passage of the cutting knife through it. B is the rectangular sliding frame on which the knife or cutter C is diagonally set. Its lower edge is constructed to slide in the slot $b$, (which may be a dovetail or shaped as represented), and its upper edge is preserved in position by the slide standard E.

F is a gage adjustably fitted to frame B made of such a length that at the extreme outward point of the knife frame's stroke it may extend through the hole $f$ of board A′ and present a gage against which the bread, &c., may be set previous to the inward stroke of the knife for slicing. Its distance behind the working frame of the knife determines the thickness of the slices, it is adjusted on the frame B by means of the screw nut $c$ and slot $h$.

G is a vertical board the shank $g$ of which is made to slide in the slot $d$ of the board A. It is designed for the purpose of directly receiving the slices as they are cut and preserving them in a vertical position till the loaf is all cut up. The slices are pushed against this board, after being cut, by a wedge shaped clearer $e$ fixed to frame B. Each slice by being pushed forward after cutting allows the gage F on the return stroke of the knife to come between it and the material remaining uncut, so as to offer a gage for the next slice.

The knife being set diagonally on its frame, effects a " draw " cut on the material under its operation.

I claim as new and of my invention herein and desire to secure by Letters Patent,

The combination of the abutment board A′, knife C, clearer $e$ and adjustable gage F, constructed, arranged and operating substantially as and for the purposes set forth.

In testimony of which invention, I hereunto set my hand.

JAMES STILLEY.

Witnesses:
  GEO. H. KNIGHT,
  C. STEEMER, Jr.